(12) United States Patent
Dallmann et al.

(10) Patent No.: US 9,766,871 B2
(45) Date of Patent: Sep. 19, 2017

(54) METHOD AND APPARATUS FOR OPERATING A PROCESSING AND/OR PRODUCTION INSTALLATION

(71) Applicant: SIEMENS AKTIENGESELLSCHAFT, München (DE)

(72) Inventors: Michael Dallmann, Wendelstein (DE); Matthias Dürr, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/891,249

(22) PCT Filed: May 16, 2013

(86) PCT No.: PCT/EP2013/060187
§ 371 (c)(1),
(2) Date: Nov. 13, 2015

(87) PCT Pub. No.: WO2014/183793
PCT Pub. Date: Nov. 20, 2014

(65) Prior Publication Data
US 2016/0092193 A1 Mar. 31, 2016

(51) Int. Cl.
*G06F 9/44* (2006.01)
*G06F 9/445* (2006.01)
(Continued)

(52) U.S. Cl.
CPC .......... *G06F 8/61* (2013.01); *G05B 19/0426* (2013.01); *G05B 19/41845* (2013.01); *Y02P 90/14* (2015.11); *Y02P 90/16* (2015.11)

(58) Field of Classification Search
CPC ..... G06F 8/61; G06F 8/60; G06F 8/65; G06F 8/68
See application file for complete search history.

(56) References Cited

U.S. PATENT DOCUMENTS

2002/0082720 A1\* 6/2002 Birzer ................ G05B 19/0426
700/18
2004/0045007 A1\* 3/2004 Boland ................... G06F 9/465
719/315
(Continued)

FOREIGN PATENT DOCUMENTS

EP 1624351 A1 2/2006
EP 1770463 A1 4/2007
(Continued)

*Primary Examiner* — Duy Khuong Nguyen
(74) *Attorney, Agent, or Firm* — Henry M. Feiereisen LLC (57) ABSTRACT

The invention relates to a method for operating a processing and/or production installation having at least two engineering systems producing a respective output file including an operating variable for at least one component of the installation. The first output file of a first engineering system is transmitted from the first engineering system to a second engineering system. A second output file is provided by a second engineering system using the first output file, and the processing and/or production installation being operated using the second output file. first origin data describing an origin of the first output file of the first engineering system, and second origin data describing an origin of the second output file from the second engineering system.

8 Claims, 8 Drawing Sheets

(51) Int. Cl.
*G05B 19/042* (2006.01)
*G05B 19/418* (2006.01)

(56) References Cited

U.S. PATENT DOCUMENTS

| | | | | |
|---|---|---|---|---|
| 2004/0194108 A1* | 9/2004 | Masui | ............... | G06F 9/5055 718/105 |
| 2004/0230377 A1* | 11/2004 | Ghosh | ............... | F03D 7/0284 702/3 |
| 2006/0070019 A1* | 3/2006 | Vishnumurty | .... | G06F 17/30289 717/101 |
| 2008/0133029 A1* | 6/2008 | Heimke | ............... | G06Q 10/06 700/2 |
| 2009/0320010 A1* | 12/2009 | Chow | ............... | G06F 11/3612 717/154 |
| 2012/0004786 A1* | 1/2012 | Lo | ............... | G05B 15/02 700/296 |

FOREIGN PATENT DOCUMENTS

| | | |
|---|---|---|
| EP | 1965316 A2 | 9/2008 |
| EP | 2112774 A1 | 10/2009 |
| WO | WO 2013030619 A1 | 3/2013 |

* cited by examiner

METHOD AND APPARATUS FOR OPERATING A PROCESSING AND/OR PRODUCTION INSTALLATION

CROSS-REFERENCES TO RELATED APPLICATIONS

This application is the U.S. National Stage of International Application No. PCT/EP2013/060187 filed May 16, 2013, which designated the United States and has been published as International Publication No. WO 2014/183793 A1, pursuant to 35 U.S.C. 119(a)-(d).

BACKGROUND OF THE INVENTION

The present invention relates to a method for operating a process and/or production installation. In addition, the present invention relates to an apparatus for operating a process and/or production installation.

In the planning and the operation of process and/or production installations, so-called tool chains are normally used. These consist of a number of engineering systems which are connected to one another along a predetermined operating sequence. In this context, output files are generated by the respective engineering systems which are transferred to the other engineering systems. For example, a signal list from a CAE program (CAE—Computer Aided Engineering) is used for programming control units. In this context, it is difficult to check dependences of the individual output files on one another. For example, an upper limit value is defined for the temperature measurement with a CAE tool. Later, this value is transferred, using export and import functions, to an engineering system which is used for controlling the control units. Later, this limit value can be changed by means of an engineering system or by a monitoring and control unit. By this means, inconsistencies between the data which are provided with the CAE tool and the data which are provided by the engineering system for controlling the control units can arise. In this process, the persons who operate the installation are not informed about these contradictions, however. In addition, version management is not supported in most of the engineering systems.

To solve this problem, different tools and/or processes are normally provided. Examples of this are organizational processes or engineering processes by means of which changes can be monitored. However, these special functions are usually used only in particular applications or engineering systems. For example, a so-called "upload" function is provided with the SIMATIC PCS 7 tool by means of which current parameters and values are transferred from the installation back into the associated engineering system. Usually, the operators of the installation are responsible for avoiding such inconsistencies. For the purpose of documentation and for project management, table calculation programs or text processing programs are normally used.

SUMMARY OF THE INVENTION

It is the object of the present invention to operate a process and/or production installation more reliably.

According to one aspect of the invention, the object is achieved by a method for operating a processing and/or production installation, including the provision of at least two engineering systems for respectively generating an output file which comprises an operating variable for at least one component of the process and/or production installation, the provision of a first output file by means of a first one of the engineering systems, the transmission of the first output file from the first one of the engineering systems to at least one second one of the engineering systems, the provision of a second output file by means of the at least second one of the engineering systems using the first output file and the operating of the process and/or production installation in dependence on the second output file, wherein first origin data which describe an origin of the first output file from the first one of the engineering systems and second origin data which describe an origin of the second output file from the second one of the engineering systems are provided.

The method can also be used for putting a processing and/or production installation into operation. At present, at least two engineering systems that are arranged in a predetermined operating sequence, a so-called tool chain, are used. A first output file is generated which comprises information on an operating variable of at least one component of the installation using the first engineering system. Such an operating variable can be, for example, a limit value for a temperature measurement of a component of the installation. This operating variable can be stored in a control unit of the installation. This first output file is transferred from the first engineering system to the second engineering system. The first output file is exported by the first engineering system and imported by the second engineering system. By means of the first output file, the second engineering system creates a second output file. This second output file can be used for operating the processing and/or production installation.

In addition to the first output file of the first engineering system, first origin data are provided which describe the origin of the first output file from the first engineering system. The first origin data provide information on the fact that the first output file was created with the first engineering system. In addition, second origin data are provided which describe an origin of the second output file from the second one of the engineering systems. By means of the first and second origin data, it is thus possible to track which output file comes from which engineering system. Thus, it is also possible to check which engineering system, for example, has provided or altered an operating variable.

Preferably, the second origin data are provided with second linkage data which exhibit a linkage to the first origin data. The second origin data can be provided, for example, together with the second linkage data in a common file. By means of the second linkage data, a direct link to the first origin data can be provided which specify that the first output file has been provided by the first engineering system. It is thus possible to examine the dependence between the output files in a simple manner.

In one embodiment, a timestamp and/or a version number are provided in addition to the first and the second origin data. By means of a timestamp, it is simple to track when an output file has been created by an engineering system. By means of a version number, it is possible to check in a simple manner how often an output file has already been changed. It is thus possible to discover any inconsistencies in the output files of the engineering systems.

In one embodiment, in the case of a change of the operating variable of the at least one component, the changed operating variable is transmitted from the second one to the first one of the engineering systems by means of the second linkage data. An operating variable of a component can be changed, for example, by an operating input or by an engineering system itself. In order to transfer this changed operating variable to all engineering systems, for example, an output file can be generated by the at least second engineering system which output file is transferred to the first one of the engineering systems in opposition to the direction of processing of the tool chain. The output file which is generated by the second one of the engineering systems can comprise the changed operating variable.

Preferably, an error message is generated if the changed operating variable is not transmitted from the second one to the first one of the engineering systems. By this means it is possible to ensure that the current operating variables are present in the engineering systems as basis for planning and/or controlling the installation.

In a further embodiment, the first origin files are provided in the first output file and the second origin files are provided in the second output file. Thus, the respective origin files can be transmitted to the engineering systems together with the associated output files. This makes it possible to guarantee reliably that the origin files are transmitted to the engineering systems.

As an alternative, the first and the second origin files are provided in each case in a separate file. The respective origin data can be collected in a higher-level file. This makes it possible to provide an overview of which files have been provided by which engineering system.

In a further embodiment, the first origin data are provided by the first one of the engineering systems and the second origin data are provided by the second one of the engineering systems. When generating the respective output file, the engineering system can generate the associated origin file at the same time. This variant is suitable, in particular, when the origin data are provided together with the respective output file. In a further embodiment, the first and the second origin data are provided by a separate computing facility. On this separate or higher-level computing facility, the current origin data can also be stored. Thus, a higher-level computing facility can be provided by means of which the output files and the associated origin data are managed. This makes it possible to prevent inconsistencies between the output files and the operating variables contained therein.

According to another aspect of the invention, the apparatus for operating a processing and/or production installation includes a multiplicity of engineering systems for respectively generating an output file which comprises an operating variable for at least one component of the process and/or production installation, wherein by means of a first one of the engineering systems, a first output file can be provided and transmitted from the first one of the engineering systems to at least one second one of the engineering systems, and wherein by means of the at least second one of the engineering systems, a second output file can be provided using the first output file and wherein the process and/or production installation can be operated with the apparatus in dependence on the second output file and wherein the apparatus is designed to provide first origin data which describe an origin of the first output file from the first one of the engineering systems and second origin data which describe an origin of the second output file from the second one of the engineering systems.

BRIEF DESCRIPTION OF THE DRAWINGS

The advantages and developments previously described in conjunction with the method according to the invention can be transferred to the apparatus according to the invention.

The present invention will now be explained in greater detail by means of the attached drawings, in which.

DETAILED DESCRIPTION OF PREFERRED EMBODIMENTS

The exemplary embodiments described in greater detail in the text which follows represent preferred embodiments of the present invention.

Figure 1:
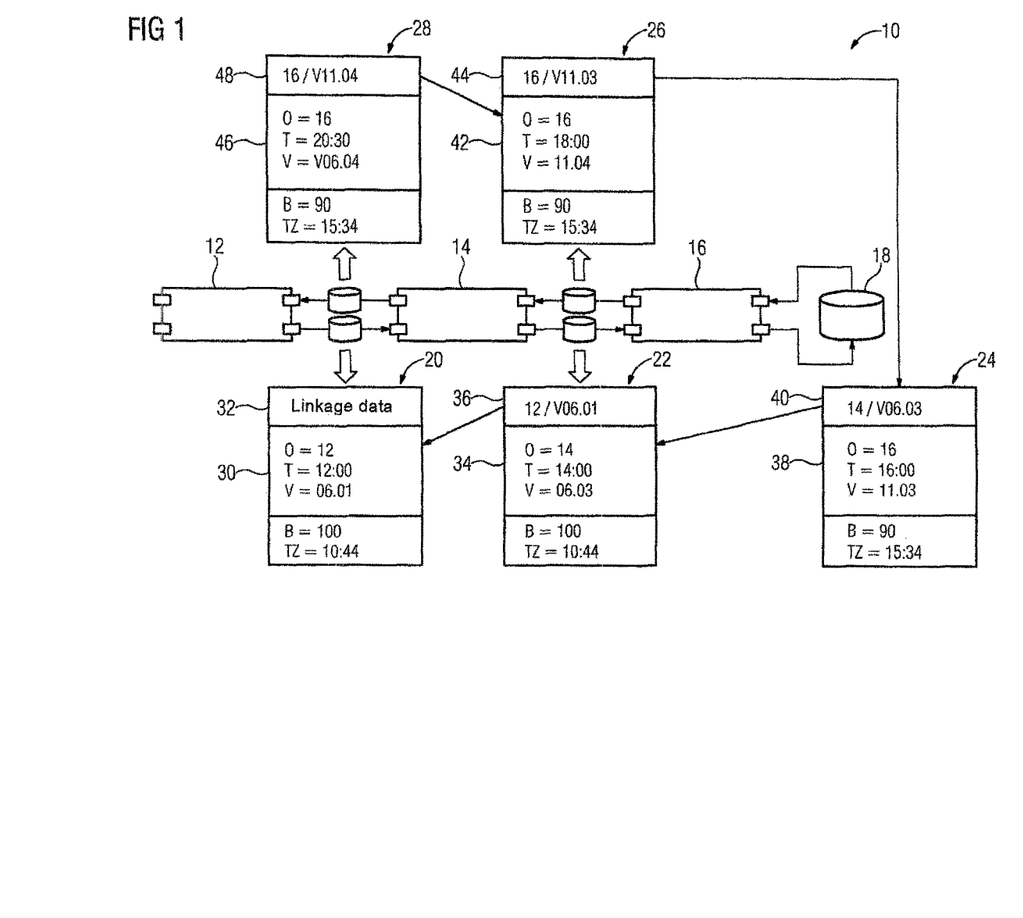
FIG. 1 shows a diagrammatic representation of an apparatus for operating a process and/or production installation.

FIG. 1 shows a diagrammatic representation of an apparatus 10 for controlling a process and/or production installation. The apparatus 10 comprises at least two engineering systems. In the present exemplary embodiment, the apparatus 10 comprises three engineering systems 12, 14 and 16. The engineering systems 12, 14, 16 are arranged in succession in their process sequence in a tool chain. Each of the engineering systems 12, 14, 16 generates an output file which comprises information on at least one operating variable of the installation. In the present exemplary embodiment, the first one of the engineering systems 12 is a tool by means of which a pipeline and instrumentation plan of the installation can be provided. The first engineering system 12 generates a first file 20 which is transmitted to the second engineering system 14. The second engineering system 14 is in the present case an engineering system by means of which a circuit diagram of the installation is provided. Using the first output file 20 which is provided by the first engineering system 12, a second output file 22 is generated by the second engineering system 14. The second output file 22 is transmitted to a third engineering system 16. The third engineering system 16 is in the present exemplary embodiment a tool by means of which a program code for control units of the installation can be provided.

The first output file 20 comprises first origin data 30. In the origin data 30, an origin indication O is specified which indicates by which engineering system 12, 14, 16 the output file 20 has been generated. Furthermore, the origin file 30 comprises a timestamp T and a version indication V. Furthermore, an operating variable B which, in the present example, specifies a maximum value at a temperature measurement, is deposited in the origin file. In addition, the second timestamp T2 identifies the time of change of the operating variable B. Furthermore, the first origin file 30 comprises first linkage data 32 to the origin data of the engineering system or, respectively, origin files, from which the output file has been received. In the present case, the first linkage file 32 is empty since the first engineering system 12 has not received an output file from another engineering system. In the present case, the origin files 30 are integrated as header in a predetermined file format in the first output file 20.

By means of the second engineering system 14, a second output file 22 is generated by means of the first output file 20. The second output file 22, too, contains second origin data 34 which comprise an origin indication O, a timestamp T and a version indication V. In addition, the second origin data 34 comprise second linkage data 36 which establish a linkage to the first origin data 30 of the first output file 20. The third output file 24, too, comprises corresponding origin data 38 and third linkage data 40 which refer to the second origin data 34.

In the present case, the operating variable B is now changed from 100° C. to 90° C. This change can be made, for example, by the third engineering system 16 or by a user input. The third output file 24 is transferred to a higher-level control unit 18 by means of which a change of the operating variable B can be detected. As a consequence of the change of the operating variable B, a fourth output file 26, which is transferred to the second engineering system 14, is generated by the third engineering system 16. Furthermore, a fifth output file 28, which is transferred to the first engineering system 12, is generated by the second engineering system 14. The fifth output file 26 comprises fifth origin data 42 and fifth linkage data 44. The sixth output file 28 comprises sixth origin data 46 and sixth linkage data 48. Thus, the change of the operating variable B can be transferred to all engineering systems 12, 14, 16 and inconsistencies can thus be avoided.

Figure 2:
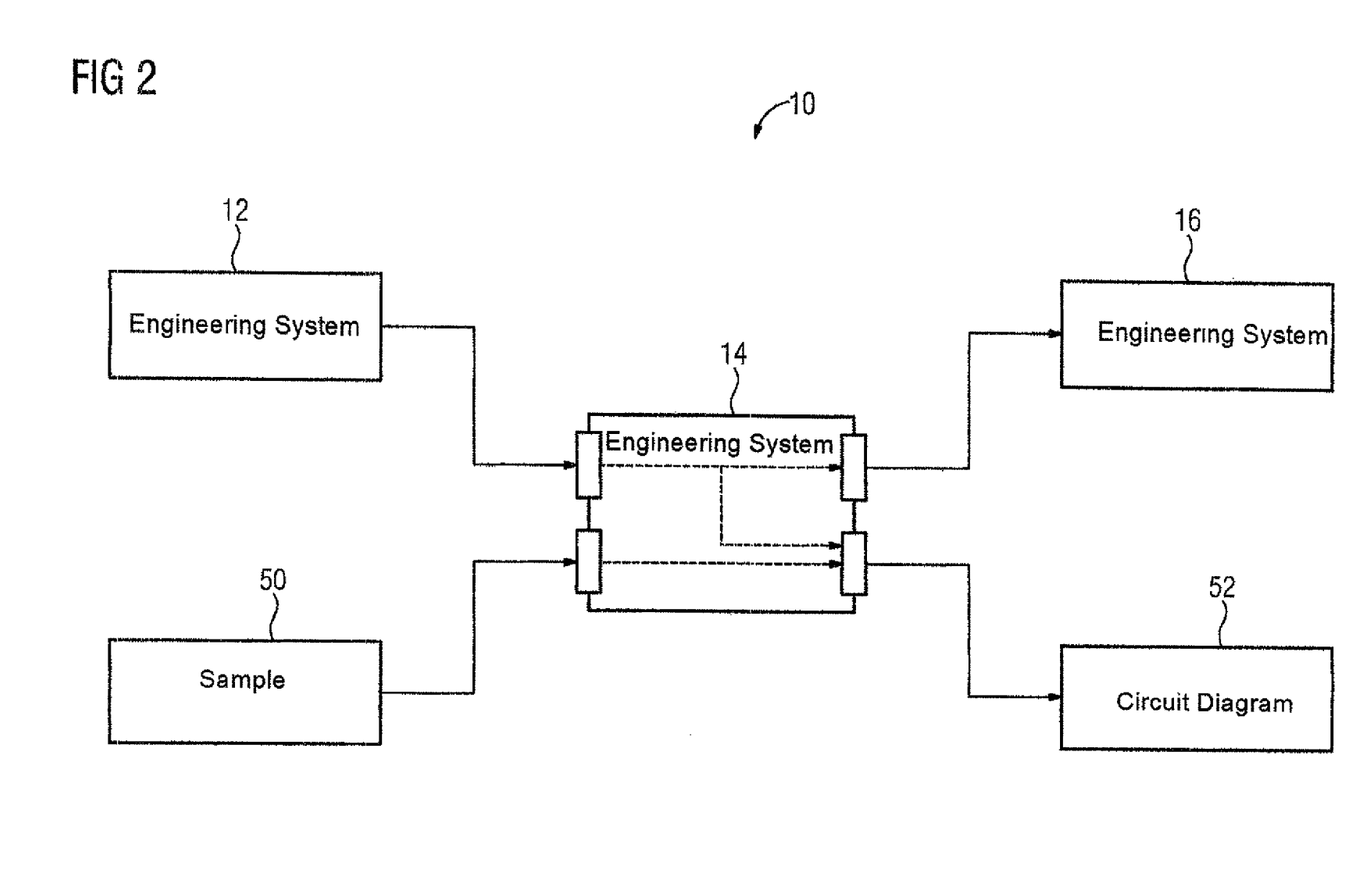
FIG. 2 shows a diagrammatic representation of the apparatus according to FIG. 1 according to a further embodiment.

FIG. 2 shows a diagrammatic representation of the apparatus 10 in a further embodiment. In this case, the second engineering system 14 is used as a central node. In the present case, a sample 50 for a circuit diagram is supplied to the second engineering system 14. Using this sample 50, the second engineering system 14 can create a circuit diagram 52 in dependence on information or the output file 20 from the first engineering system 12.

Using a higher-level control unit 18 by means of which linkages between the engineering systems 12, 14, 16 are deposited, for example, by means of the respective linkage data 32, 36, 40, 44, 48, it is possible to verify inconsistencies in the output files 20, 22, 24, 26, 28 and the operating variables B.

Figure 3:
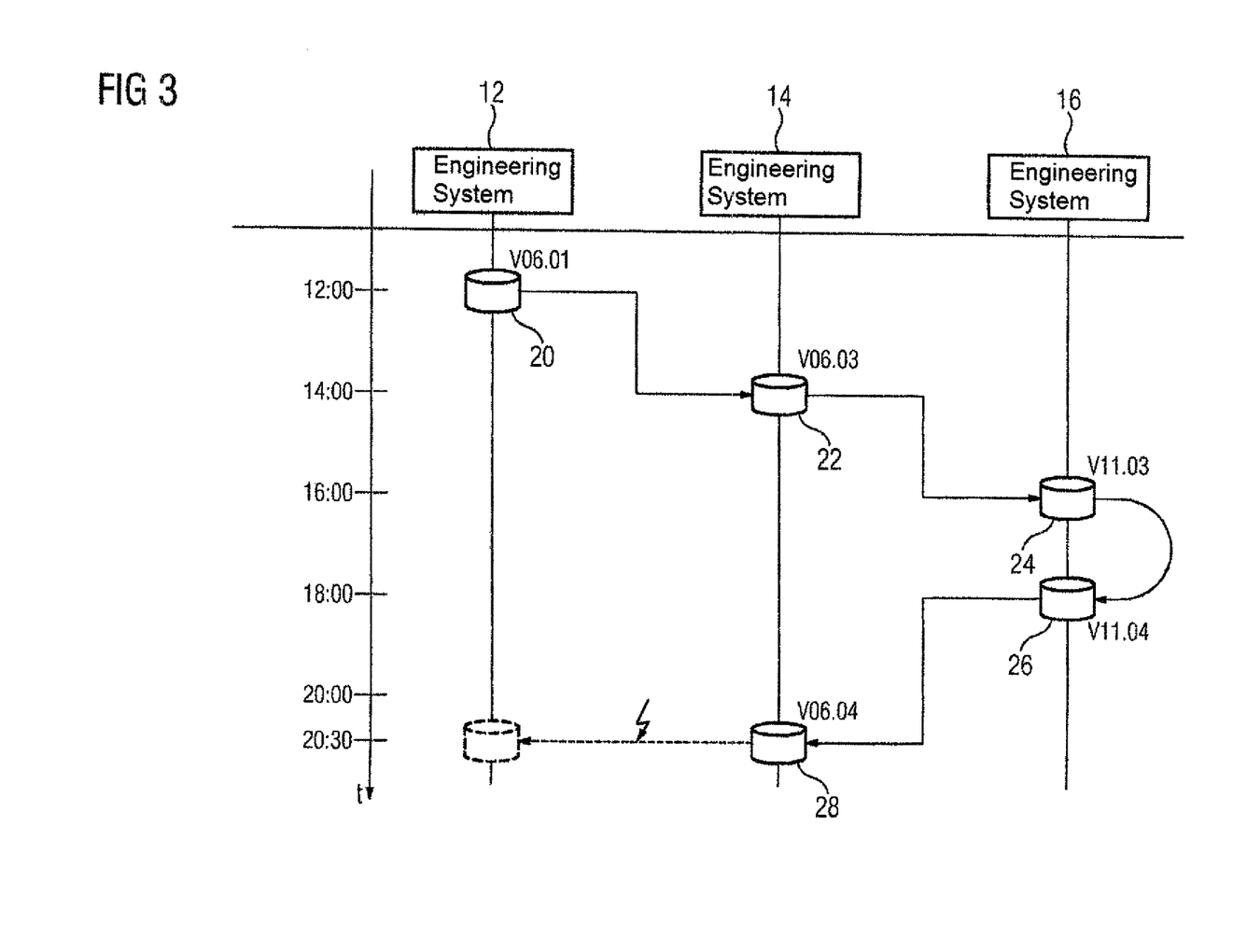
FIG. 3 shows a timing schedule in which the provision of output files by engineering systems of the process and/or production installation is illustrated.

FIG. 3 shows a timeline of the generation of the output files 20, 22, 24, 26, 28 with the engineering systems 12, 14, 16 according to the example of FIG. 1. In the present example, the second engineering system 14 generates an output file which is not transmitted to the first engineering system 12. In consequence, the operating variable B was not updated in the first engineering system 12. By means of the higher-level control unit 18, a corresponding warning signal is now output which provides an indication that inconsistencies can exist in the output files 20, 22, 24, 26, 28 or the operating variables B, respectively.

Figure 4:
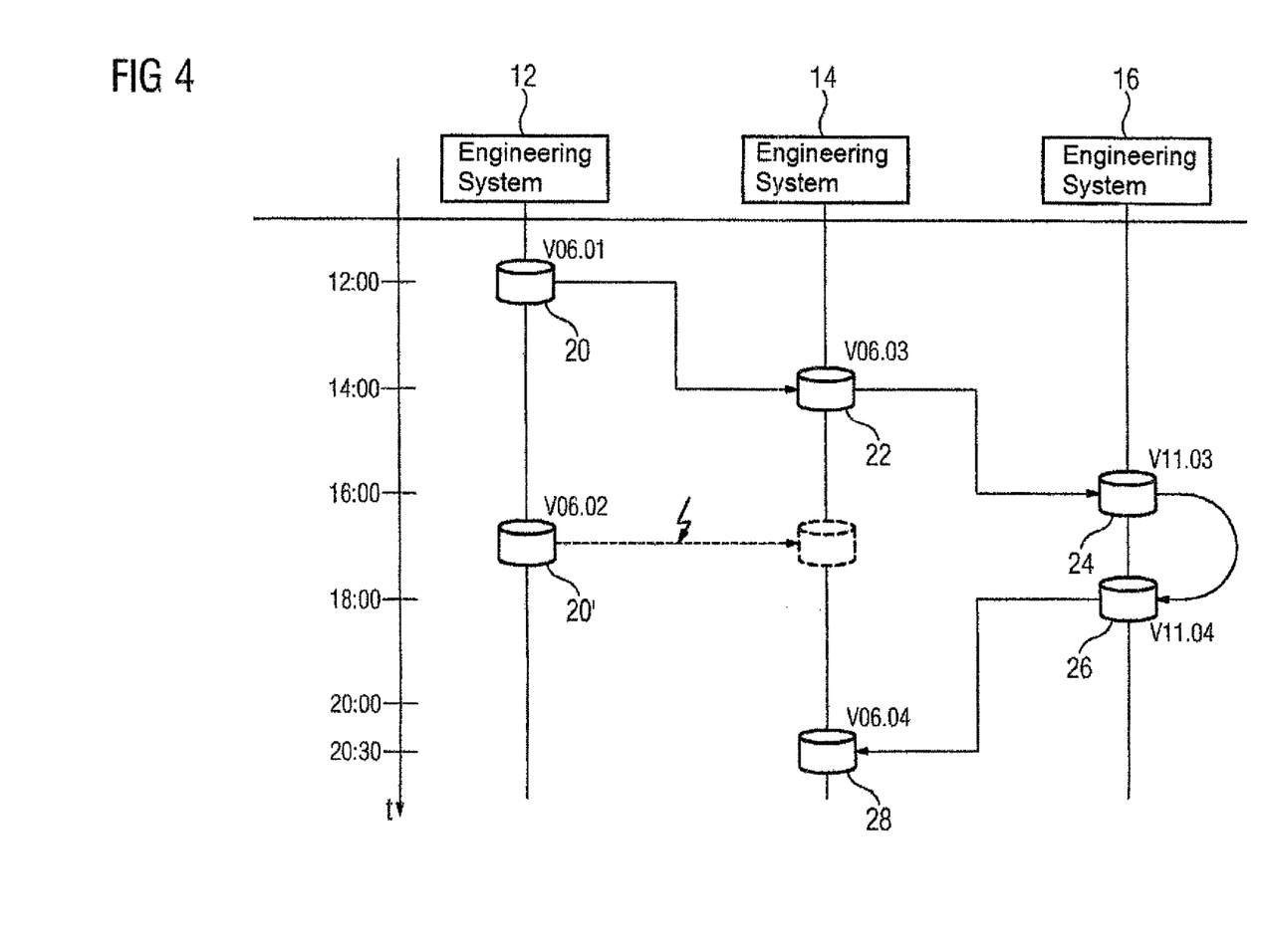
FIG. 4 shows a temporal representation according to FIG. 3 in a further embodiment.

FIG. 4 shows a further example of a timeline of generating the output files 20, 22, 24, 26, 28 of the engineering systems 12, 14, 16. In the present case, a seventh output file 20' is generated by means of the first engineering system 12 which, however, is not transmitted to the second engineering system 14. In the second engineering system 14, the operating variable B is stored which was transferred to the second engineering system from the third engineering system 16 in consequence of the change. Using the higher-level control unit, it is possible to check, by means of the origin data of the output files, the version number V, the timestamp T and the origin indications O whether there are inconsistencies in the data. In this context, it can also be provided that, in the case of changes within the installation or during the creation of revisions, an output file is generated automatically by the respective engineering system 12, 14, 16. In this context, it can also be sufficient if, instead of the complete output file, only the origin data 30, 34, 38, 42, 46 are transmitted.

For the origin data 30, 34, 38, 42, 46, standardized headers can be used. In principle, there are two options for providing the header. On the one hand, headers can be provided in the respective output files 20, 22, 24, 26, 28. As an alternative, the headers can be stored with the origin data 30, 34, 38, 42, 46 in a separate file. If only one file is provided, the output files and the associated header can be provided with the origin data with different file changes. The header can then be provided directly with the respective engineering system 12, 14, 16 or with a separate computing facility. This separate computing facility can be activated, for example, by the respective engineering system 12, 14, 16. As an alternative, the separate computing facility can read out corresponding storage areas in the engineering systems 12, 14, 16 at predetermined times.

Figure 5:
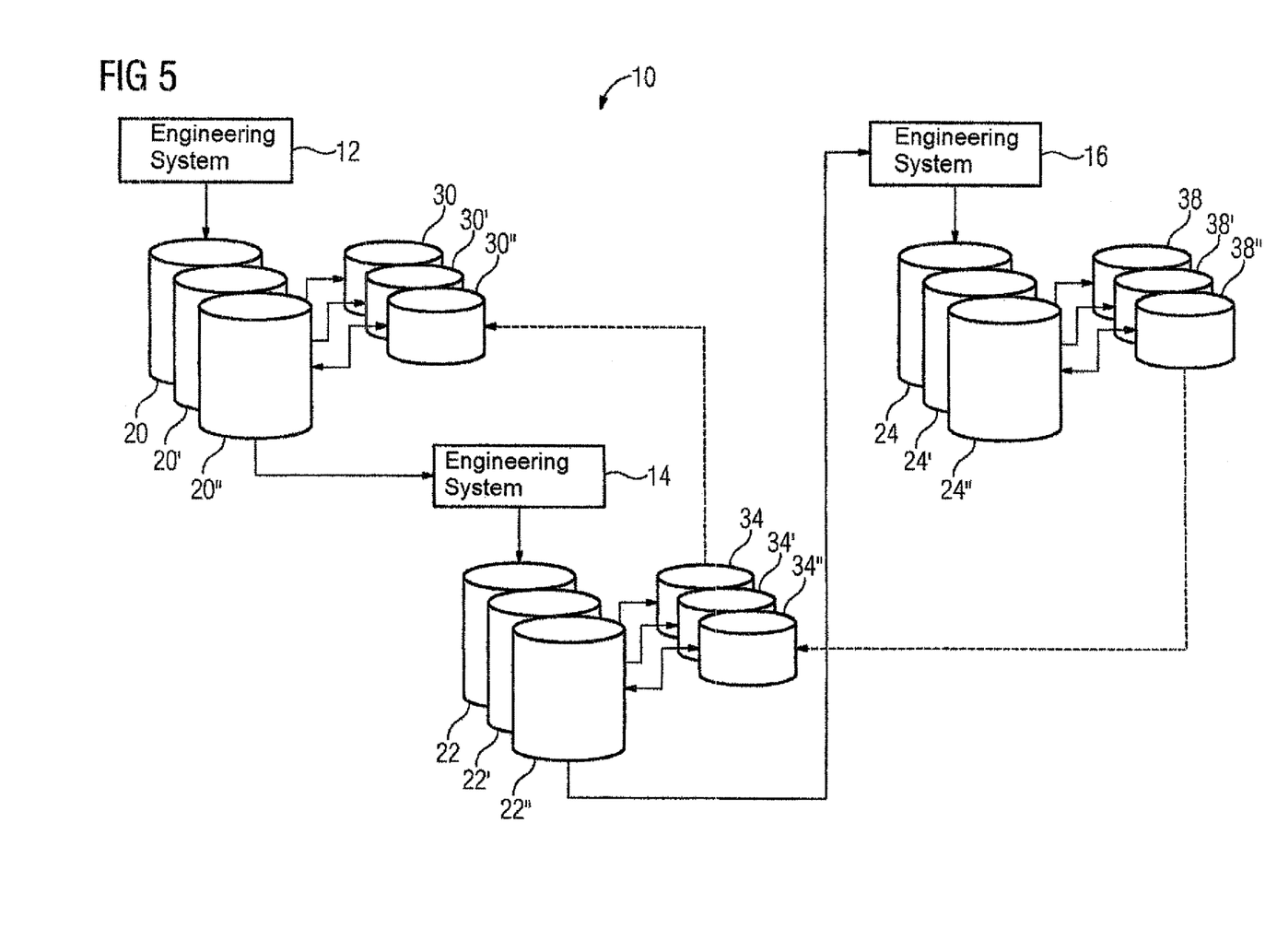
FIG. 5 shows a diagrammatic representation of the apparatus in a further embodiment.

FIG. 5 shows a diagrammatic representation of the apparatus 10, in which a number of data are used for the respective output files 20, 22, 24, 26, 28, which are stored in a common storage facility. The associated header files with the origin data are also stored in the storage facility with a separate file name and a separate ending. For example, three output files 20, 20' and 20" and respectively associated origin data 30, 30' and 30" are generated successively in time with the first engineering system. In order to be able to differentiate between the origin data 30, 30', 30", the timestamps T can be used, for example. By means of the origin indications O, it is possible to distinguish whether the files have been imported from another engineering system or have been changed by the engineering system 12, 14, 16 itself. By this means, it is possible to verify in a simple manner by which engineering system 12, 14, 16 a change has been effected. This information can be used, for example, for the management of the installation or, in the worst case, for evaluating damages in the installation. In this context, the origin data can also be designed in such a manner that it cannot be changed, for example by the operator of the installation.

Apart from origin data, an additional functionality can be provided in that, for the respective output files, a reference to the origin of the output files 20, 22, 24, 26, 28 is stored. This information can also be stored in a separate storage facility in order to avoid changes in the existing systems. Thus, the references between the individual output files 20, 22, 24, 26, 28 and the engineering systems 12, 14, 16, respectively, can be identified.

Figure 6:
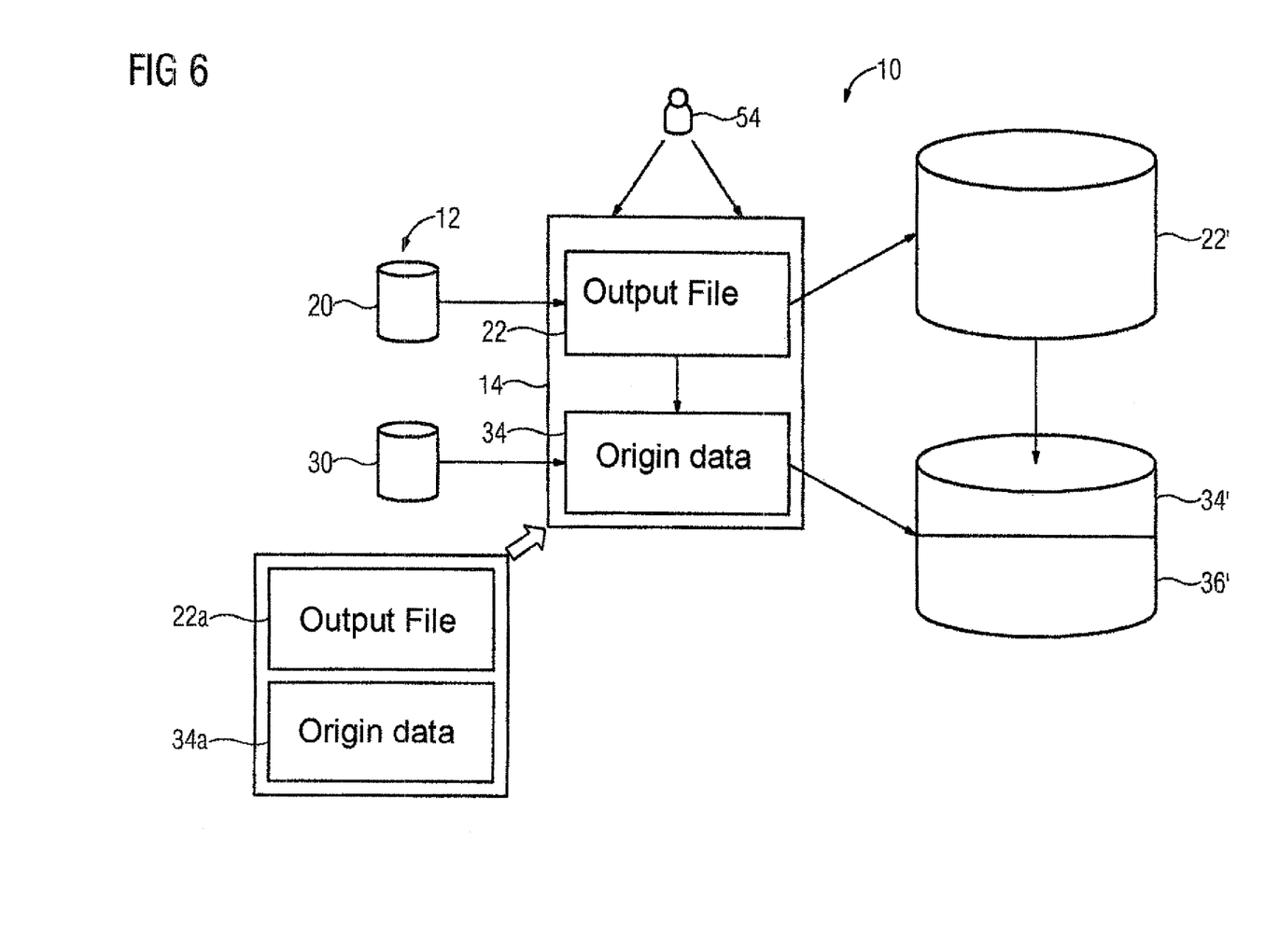
FIG. 6 shows a diagrammatic representation of the apparatus in a further embodiment.

FIG. 6 shows a diagrammatic representation of the apparatus 10 in a further embodiment. In this context, an importation of output files 20 into the second engineering system 14 is initiated by an administrator 54. In this context, the first origin files 30 are initially transferred from the first engineering system 12 to the second engineering system 14. Following this, the first output file 20 is transferred from the first engineering system 12 to the second engineering system 14. Beginning with the output files 20a originally stored in the second engineering system 14, output data 22 and origin data 34 are created by the first engineering system 12 by means of the first output files 20 and the first origin data. By means of the second engineering system 14, it is now possible to generate by means of the second origin data 34 a corresponding header which has a reference to the first origin data 30 of the first engineering system 12. As an alternative, a second output file 22' can be provided by means of the second engineering system 14 and a separate computing facility generates the origin data 34 from the second output file 22'.

Figure 7:
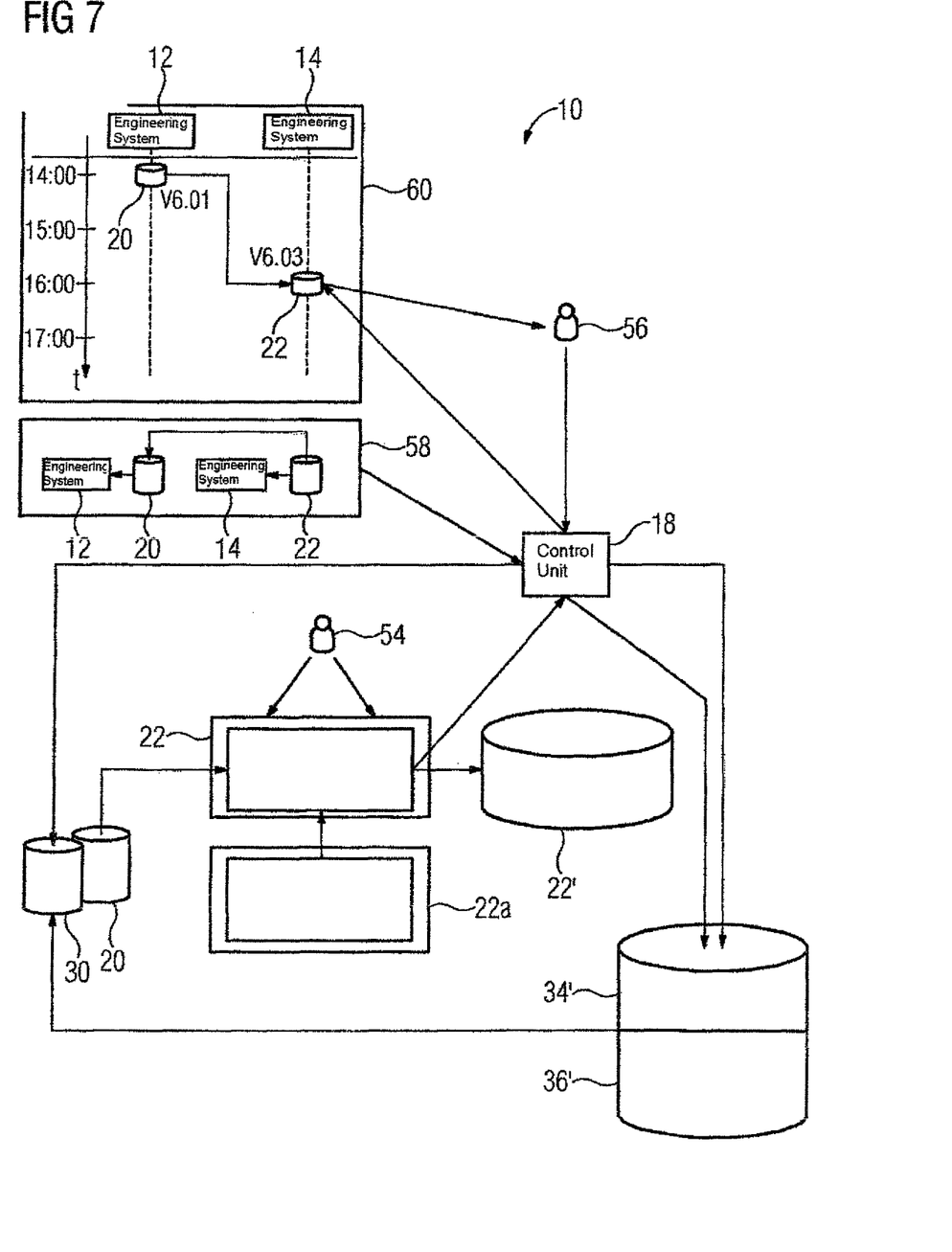
FIG. 7 shows a diagrammatic representation of the apparatus in a further embodiment.

FIG. 7 shows the apparatus 10 in a further diagrammatic representation. In this exemplary embodiment, the second engineering system 14 is designed to store timestamps T and changes. However, the second engineering system 14 is not designed to provide corresponding origin data or linkage data. In the present case, a second output file 22' is generated by means of the second engineering system 14 using the first output file 20 from the first engineering system 12. Providing the second output file 22' addresses a higher-level control unit 18. In the higher-level control unit 18, the configuration of the engineering systems 12, 14, 16 is deposited. Using this information, the higher-level control unit 18 can generate origin data 34'. These second origin data 34' also comprise linkage data 36' which exhibit a linkage to the first origin data 30 of the first engineering system 12. A project manager 56 of the installation can check by the data deposited in the higher-level control unit 18 the references between the engineering systems 12, 14, 16, and the associated output files or origin data, respectively. In addition, the linkage between engineering systems 12, 14, 16 can be represented to the project manager 56 in a first representation 58. As an alternative, the generation of output files of the engineering systems 12, 14, 16 can be represented to the project manager 56 in dependence on time t in a second graphic representation 60.

Figure 8:
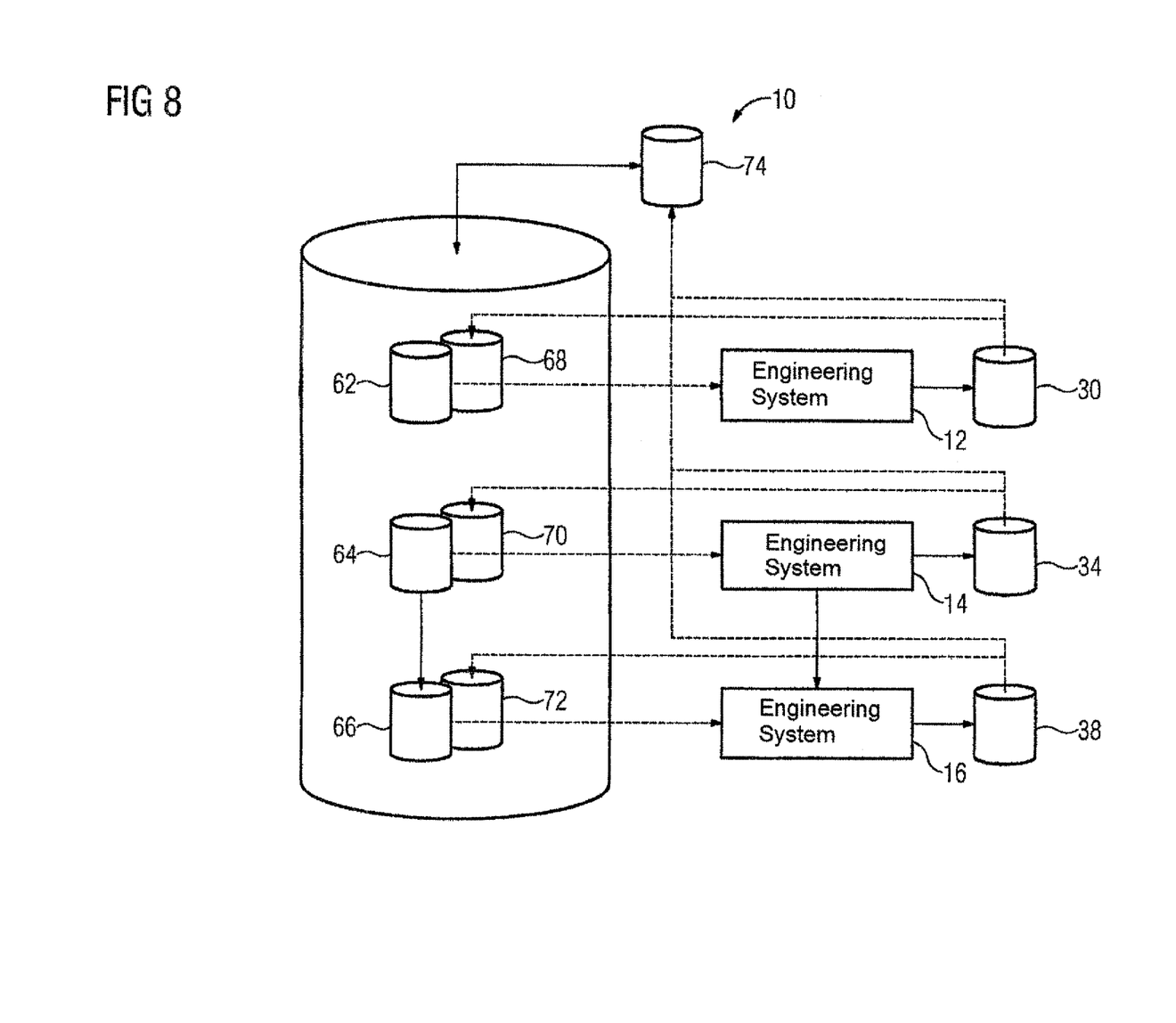
FIG. 8 shows a diagrammatic representation for illustrating the creation of output files and origin data of the engineering systems.

For the creation of output files and origin data, corresponding samples can be used. This is illustrated diagrammatically in FIG. 8. The use of samples is particularly suitable for heterogeneous engineering systems which are used, for example, for mechanical, electrical or automation fields. In the present case, corresponding samples are used for output files 62, 64, 66 by the engineering systems 12, 14, 16. Using the samples 42, 44, 46, an origin file 30, 34, 38 is generated in each case by means of the engineering systems. The information from the origin data 30, 34, is in each case used for creating corresponding samples 68, 70, 72 for origin data. In addition, information from the origin data 30, 34, 38 is supplied to a higher-level sample 74 for origin data. Thus, corresponding standards can be provided for the samples which can be used for planning and controlling the installation.

By means of the apparatus 10 described before, the dependences between the engineering systems 12, 14, 16 and the associated output files can be determined in a simple manner on the basis of the origin data and the linkage data. Thus, changes, for example of the operating variables B, can be tracked in a simple manner. In addition, no additional version management is needed. Furthermore, the operators of the installation are able to obtain an overview of the linkages between the engineering systems in a simple manner.

The invention claimed is:

1. A computer-implemented method of operating a production installation having at least two computer-operated engineering systems arranged in an operating sequence, said method comprising:
   generating a first output file by a first computer-operated engineering system, said first output file comprising information on an operating variable of at least one component of the installation,
   transmitting the first output file to a second computer-operated engineering system by exporting the first output file by the first computer-operated engineering system and importing the first output file by the second computer-operated engineering system,
   operating the installation using a second output file produced by the second computer-operated engineering system using the first output file;
   providing first origin data that describes an origin of the first output file from the first computer-operated engineering system and second origin data that describes an origin of the second output file from the second computer-operated engineering system, and second linkage data describing a linkage of the second origin data to the first origin data;
   transmitting a changed operating variable of at least one component of the installation from the second computer-operated engineering system to the first computer-operated engineering system using the second linkage data; and
   generating an error message when the changed operating variable is not transmitted from the second computer-operated engineering system to the first computer-operated engineering system, wherein the first computer-operated engineering system is a tool for providing a pipeline and instrumentation plan of the production installation, and the second computer-operated engineering system is a tool for providing a circuit diagram of the production installation.

2. The method of claim 1, wherein, in addition to the first and the second origin data, a timestamp is provided.

3. The method of claim 1 wherein, in addition to the first and the second origin data, a version number is provided.

4. The method of claim 1, wherein the first origin data are provided in the first output file and the second origin data are provided in the second output file.

5. The method of claim 1, wherein the first and second origin data are each provided in a separate file.

6. The method of claim 1, wherein the first origin data are provided by the first computer-operated engineering system and the second origin data are provided by the second computer-operated engineering system.

7. The method of claim 1, wherein the first and second origin data are provided by a separate computing facility.

8. A computer system for operating a production installation with multiple computer-operated engineering systems arranged in an operating sequence in the installation having respective components, said computer system comprising:
   a processor,
   multiple output files, each output file including a respective operating variable for at least one component of the installation, a first output file being provided by a first computer-operated engineering system and transmitted by the first computer-operated engineering system to at least one second computer-operated engineering system, the first output file being exported by the first computer-operated engineering system and imported by the at least one second computer-operated engineering system, and the at least one second computer-operated engineering system providing a second output file using the first output file, the installation being operated using the second output file,
   first and second origin data describing an origin of the respective first and second output file, the first origin data describing an origin of the first output file from the first computer-operated engineering system and the second origin data describing an origin of the second output file from the second one of the computer-operated engineering systems, and second linkage data describing a linkage of the second origin data to the first origin data such that, when an operating variable of the at least one component changes, the second computer-operated engineering system transmits the changed operating variable to the first computer-operated engineering system using the second linkage data wherein the first origin data that describes an origin of the first output file and the second origin data that describes an origin of the second output file, the second linkage data which describe a linkage of the second origin data to the first origin data;

the second computer-operated engineering system transmits a changed operating variable of at least one component of the installation to the first computer-operated engineering system using the second linkage data; and an error message generated when the changed operating variable is not transmitted from the second computer-operated engineering system to the first computer-operated engineering system, wherein the first computer-operated engineering system is a tool for providing a pipeline and instrumentation plan of the production installation, and the second computer-operated engineering system is a tool for providing a circuit diagram of the production installation.

* * * * *